Figure 1:
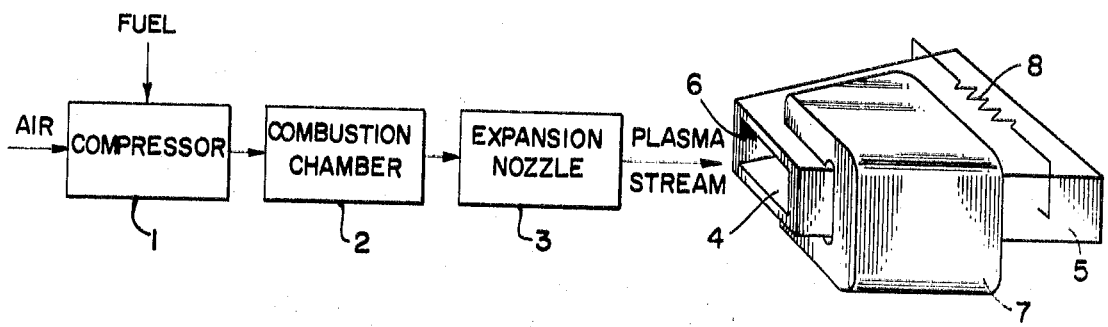

United States Patent
Aisenberg et al.

[15] 3,660,700
[45] May 2, 1972

[54] MAGNETOHYDRODYNAMIC GENERATOR

[72] Inventors: Sol Aisenberg, Natick; Kuo Wei Chang, Lexington, both of Mass.

[73] Assignee: Space Sciences Incorporated, Waltham, Mass.

[22] Filed: June 10, 1970

[21] Appl. No.: 44,973

[52] U.S. Cl. ............................................................310/11
[51] Int. Cl. .......................................................HO2n 4/02
[58] Field of Search....................................................310/11

[56] References Cited

UNITED STATES PATENTS 3,489,933   1/1970   Meyerand, Jr. et al..................310/11
2,210,918   8/1940   Karlovitz et al.........................310/11
3,390,288   6/1968   Dubois et al............................310/11
3,480,806  11/1969   Berberich................................310/11

Primary Examiner—D. X. Sliney
Attorney—Donald E. Nist

[57] ABSTRACT

An electrodeless magnetohydrodynamic generator utilizes a stream of plasma pulses. The train of plasma pulses is caused to flow along an electrically insulated channel in the generator. Within the channel is established a magnetic field shaped to provide a component that is radial with respect to the longitudinal flow of the plasma. The plasma interacts with the shaped magnetic field to establish a pulsating magnetic field in the generator channel. A multi-turn coil is inductively coupled to the pulsating magnetic field and obtains AC power as the output of the generator.

5 Claims, 3 Drawing Figures

Patented May 2, 1972

3,660,700

INVENTORS
SOL AISENBERG
KUO WEI CHANG

BY

Wolf, Greenfield & Sacks

ATTORNEYS

MAGNETOHYDRODYNAMIC GENERATOR

FIELD OF THE INVENTION

This invention relates in general to apparatus of the magnetohydrodynamic generator type in which electric power is directly generated by causing a high velocity gaseous plasma to traverse a magnetic field. More particularly, the invention pertains to an electrodeless, high conductivity, pulsed runaway electron, magnetohydrodynamic generator.

DISCUSSION OF THE PRIOR ART

In the conventional magnetohydrodynamic generator, the thermal energy of a heated, ionized, and conductive gas is converted to kinetic energy. A high velocity plasma stream is formed and is directed along a duct whose opposed walls act as electrodes. The kinetic energy is directly converted into electricity by causing the plasma stream to flow through a magnetic field in the duct so that an electric current is generated across the plasma by the plasma cutting the lines of magnetic flux. The principal advantages which MHD (magnetohydrodynamic) generators can offer over conventional generators of electric power are (1) large capacity and compactness, (2) the absence of highly stressed moving parts for which close tolerances must be maintained, (3) high efficiency, and (4) ease of maintenance. While the first two of those advantages have been achieved, the remaining two advantages (viz., high efficiency and ease of maintenance) have yet to be realized by the conventional MHD generator.

To extract high power from the plasma stream most efficiently, it is necessary to make the plasma's conductivity and velocity as high as possible. The level of the electron density in the plasma, and hence the conductivity, is limited by the plasma temperature which, in turn, is limited by the temperature that can be withstood by the wall material of the combustion chamber. Furthermore, the attainment by the plasma stream of high velocity through the process of adiabatic expansion employed in the conventional MHD generator is invariably accompanied by a drop in temperature and a reduction in conductivity. To increase conductivity, a conventional method is to seed the combusted gases with a more easily ionizable material such as potassium or sodium. However even with proper seeding, the value of the plasma's conductivity still falls below the level necessary for efficient operation, mainly due to the low gas temperature. The corrosive and penetrating action of the seeded gas on surfaces and refractory materials with which it comes in contact tends to materially lessen the life of the generator and increase the frequency of maintenance. Moreover, where the combusted gases are seeded, some means of at least partial recovery of the seed material is usually employed to avoid unnecessary expense and to minimize pollution of the atmosphere to which the spent gases are exhausted.

Most of the conventional MHD generators produce a low voltage DC (direct current) output and costly provisions for inverting the DC to AC (alternating current) are required to make the power suitable for utility applications. Because of the low conductivity of the plasma in the conventional MHD generator, the output power density is relatively small so that a large duct is required where a significant portion of the power is removed from the gas stream. For a large duct, the wall losses, which include the heat transfer, friction and electrode losses, and the loss due to the local Hall current around each segmented electrode, are also large. Therefore, the conventional MHD generator has to be of large capacity in order to maintain the volume to surface ratio within the limits required for acceptable efficiency.

It is apparent from the foregoing that it is difficult to obtain high velocity concurrently with high plasma conductivity, and this is especially so with the simple arrangement of a combustion chamber followed by a nozzle. The principal difficulty appears to reside in using the same medium as both the thermodynamic working fluid to provide the high velocity and as the electrical conductor which necessitates a high gas temperature. One approach to solving the difficulty is to employ two fluids, one of which has a sufficiently high temperature to be a good conductor and the other of which has its heat energy converted to kinetic energy which is then used to carry the conducting gas to the requisite high flow velocity. The procedure of seeding the combusted gases with a more easily ionized material is an attempt to utilize the two fluid concept. However, the seeding process falls far short of the ideal two fluid concept.

OBJECTS OF THE INVENTION

The principal objective of the invention is to provide an efficient MHD generator capable of directly producing AC power. A further object of the invention is to provide an efficient MHD generator in which high levels of electron density and plasma conductivity are achieved without seeding, although seeding can be used for further improvement of the conductivity. Yet another object of the invention is to provide an MHD generator which avoids the frequent maintenance now required for the conventional MHD generator which employs electrodes in the generator channel. An additional objective is to provide an MHD generator which can efficiently produce electrical power although embodied in apparatus of small capacity.

THE DRAWINGS

Figure 2:
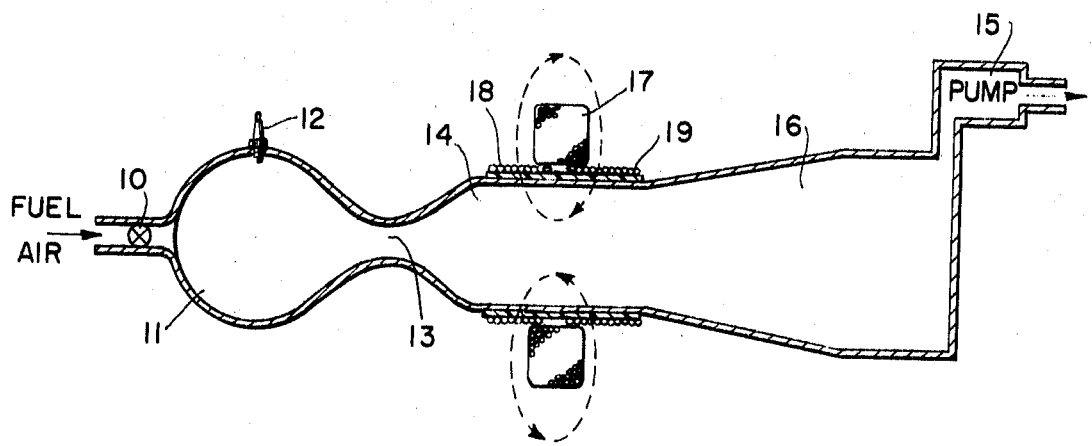
Figure 3:
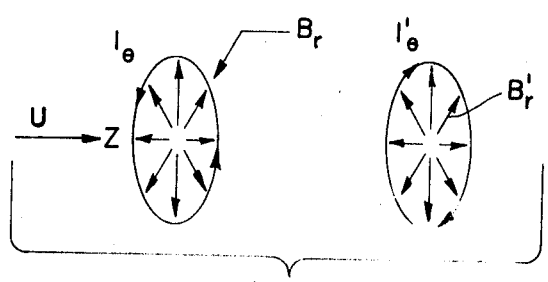

The invention, both as to its arrangement and its mode of operation, can be better understood from the exposition which follows when it is considered together with the appended drawings in which:

FIG. 1 schematically depicts the arrangement of a conventional MHD generator;

FIG. 2 illustrates the arrangement of the preferred embodiment of the invention; and FIG. 3 diagramatically shows the action of the magnetic field on electrons in the plasma.

THE EXPOSITION

Referring now to FIG. 1, there is shown the scheme of a conventional MHD power generator. In the conventional MHD generator, fuel and air are first compressed by a compressor 1 and then introduced continuously into a combustion chamber 2 where the fuel-air mixture is seeded and burned under constant pressure condition. The resulting combusted gases are expanded through a nozzle 3 to form a high velocity plasma stream which enters the generator channel 4. The generator channel 4 is essentially an elongated duct whose sides 5 and 6 act as electrodes. To accommodate the hot gases as they flow through the duct and yield up their kinetic energy, the duct increases in cross-sectional area from the inlet port to the output port. A magnetic field, here depicted as being provided by the magnet 7, is applied across the duct. As the gases in the plasma stream are ionized and conductive, an electric current is generated across the plasma stream and flows through the electrodes to the load 8. The electrodes, in the conventional MHD generator, are segmented because of the e.m.f. gradient which exists along the duct, but for ease of exposition, electrodes of integral construction are shown in FIG. 1. The residual heat in the gas stream at the exit port can be further utilized in conventional apparatus to produce stream or to preheat the inlet air or fuel.

In the conventional MHD generator, the electrodes are exposed to the plasma stream. The electrode material, therefore, must be able to withstand the action of that stream for a considerable period of time if frequent shut downs for maintenance are to be avoided. In addition, in the conventional MHD generator, there is an "electrode sheath" loss caused by the lower conductivity of that part of the plasma stream that is immediately adjacent to the electrodes. Further, a localized Hall current is known to exist near the segmented electrodes of the conventional MHD generator which also contributes to the losses in the generator. It is apparent, that the elimination of electrodes from the MHD generator would result in obviating some of the problems associated with those structures.

The invention here disclosed resides in an MHD generator which does not employ the electrodes of the conventional generator but rather extracts electrical energy by electrical induction. The scheme of a preferred embodiment of the invention is depicted in FIG. 2. A mixture of fuel and air is admitted through a valve 10 into a combustion chamber 11. The mixture can, if desired, be admitted into the chamber at atmospheric pressure. When a sufficient charge is in the combustion chamber, the valve 10 is closed and the mixture is ignited, as by the spark plug 12, to form a high temperature and high pressure gas. The gas is subsequently expanded through a converging-diverging nozzle 13 to form a plasma stream which enters the generator channel 14. The combustion procedure is repeated periodically so that the plasma stream is, in effect, a train of pulses of combusted gases.

The generator channel, in a rudimentary form, can be simply a hollow cylindrical tube whose interior wall is constructed of an electrically non-conductive material such as boron nitride. The generator channel is maintained at a low pressure to enhance the velocity of the pulsed plasma stream entering the channel. The plasma passing through the generator channel enters a diffuser section 16.

A vacuum pump 15 is employed at the exhaust port of the diffuser section 16 to discharge the exhaust into the atmosphere or to heat scavenging equipment.

Within the cylindrical generator channel 14, a shaped magnetic field having an optimum radial component is established by an electrical current flowing in an electromagnetic coil 17 disposed around the wall of the channel. To conserve electrical power, the electromagnetic coil 17 is preferably constructed of superconductive material and is provided with apparatus to maintain the coil's temperature within the superconductive region. The high velocity plasma in the generator channel interacts with the radial magnetic field to excite an azimuthal Faraday field $E_\theta$ whereby a strong ring current $I_\theta$ flows in the plasma. The ring current $I_\theta$ rises and falls in pace with the pulsed explosive combustion of the fuel. The induced ring current can be treated as a current flowing in a low impedance single turn loop which serves as the primary of a transformer whose secondary is formed by a multi-turn winding 18 encircling the wall of the generator channel. The pulsed I current establishes a pulsating magnetic field which couples to the multi-turn secondary 18 and induces an alternating current in that secondary. To permit the multi-turn winding 18 to more effectively couple to the pulsating magnetic field established by the ring current, the multi-turn winding is closely placed about the wall of the generator channel. The electromagnetic coil 17 is preferably disposed over the winding 18 and the magnetic field established by the coil 17 is indicated in FIG. 2 by the flux lines encircling the coil. The magnetic field to coil 17, therefore, has an axial component as well as a radial component.

In FIG. 3, a radial component of the shaped magnetic field established by the electromagnetic coil 17 is represented by the $B_r$ arrows and the direction of flow of the plasma is in the direction Z of the arrow U. The path of an electron in the plasma stream which enters the radial $B_r$ magnetic field is governed by the Lorenz force which acts in a direction perpendicular to the magnetic field and the velocity. The electrons therefore form a ring current which flows in the direction of the circular arrow $I_\theta$. After travelling in a spiral path along the generator channel, the electrons enter that portion of the radial field whose direction is indicated by the $B_r$ arrows in FIG. 3. The radial magnetic field is then 180° opposite to the radial magnetic field first encountered by the electrons and the Lorenz force, therefore, causes the electrons to be deflected in the direction represented by the $I'_\theta$ arrow. Consequently, in the after part of the generator channel, the ring current flows in the direction represented by the $I'_\theta$ arrow. The $I'_\theta$ ring current gives rise to a pulsating magnetic field that induces an alternating current in a secondary winding 19 which is closely placed about the wall of the generator channel. Thus, the MHD generator embodiment of FIG. 2 has two outputs, both of which are alternating currents. The secondary windings 18 and 19 are preferably arranged to minimize coupling between those windings. It should be understood that the second output winding 19 is not essential to the invention because most of the energy can be extracted by the first output winding 18. However, by employing two output windings, the magnetic field established by the coil 17 is more efficiently utilized in that some of the energy remaining in the plasma after passing through the first radial field component is recovered by the second output winding when the plasma encounters the reverse radial field component.

An important feature of the invention is the considerable increase in plasma conductivity which occurs from nonequilibrium ionization as a result of the induced Faraday field and current, and the increased mean free path of runaway electrons. In the invention, the thermal energy of the combusted gas is, in large part, transformed into kinetic energy, leaving the ion and neutral particles in the plasma at a low temperature. As the plasma enters the generator channel, part of the kinetic energy is fed, preferentially into the electrons to increase their temperature on account of the large E/P value in the generator channel. By establishing proper operating conditions, this reheating of electrons can be efficiently achieved through the "runaway electron" mode. As a result, additional plasma electrons are generated to cause a considerable increase in plasma conductivity.

Due to the uniform Faraday electric field E that is imposed on the plasma, the electrons, being negatively charged, drift in the direction opposite to that of the field. Where the energy increase of the electrons between collisions is larger than their thermal energy, the electrons gain energy at a rate exceeding the rate of loss of energy due to collisions. In addition, as the collision cross-section decreases with increasing electron energy, the electrons tend to gain energy at an ever increasing rate until finally the gain is offset by losses such as occur when an ionization collision results.

The runaway electron process observed in plasma confinement experiments usually occurs in an almost fully ionized plasma and is, therefore, different from that encountered in the invention where the plasma is initially weakly and partially ionized. In the runaway electron process encountered in the plasma confinement experiments, because of the nature of the Rutherford scattering, only a small portion of the electrons at the high energy end of the distribution can run away and acquire extremely large energy. In the invention, because electron interaction with neutral particles is frequent, and because the electron-neutral particle collision cross-section decreases noticeably with increasing electron energy for common combustion products, a different process results. In that process, all electrons tend to approach a certain equilibrium energy which is usually greater than the ionization potential of the neutral particles. Therefore, ionization of the plasmas is enhanced by electron-neutral particle ionizing collisions, resulting in higher plasma conductivity. More importantly, the runaway electrons further improve the plasma conductivity by the increased collision mean free path.

In contrast with the conventional MHD generator where the air and fuel are continuously introduced into the combustion chamber, in the invention the combustion process is intermittent. In the conventional MHD generator the gas temperature in the combustion chamber must not exceed the temperature which the wall material of the chamber can tolerate. In contrast, because of the intermittent combustion occurring in the invention, the gas temperature in the combustion chamber can be considerably higher than the temperature of the chamber walls since the peak temperature persists for only a short time relative to the thermal duty cycle.

While only the preferred embodiment of the invention has been here described, it is obvious that the invention can be embodied in other forms. It is not intended, therefore, that the scope of the invention be restricted to the precise structure or arrangement illustrated in the drawings or described in the exposition. For example, the apparatus for furnishing the pulsed plasma stream and the manner of introducing the stream into the generator channel may take forms other than that here described. Where a continuous plasma stream is available, it is readily forseeable that devices may be employed to modulate the stream to form plasma pulses. It is intended, therefore, that the scope of the invention be delimited by the appended claims and that within that scope be included only that apparatus which in essence utilizes the invention.

What is claimed is:

1. A magnetohydrodynamic generator comprising
   a generator channel having non-conductive interior walls;
   a source providing hot gases;
   expansion nozzle means interposed between said source and the generator channel, the expansion nozzle means permitting the hot gases to flow with high velocity into the generator channel as a plasma stream;
   means for establishing within the generator channel a shaped magnetic field having a large component that is radial with respect to the longitudinal axis of the channel, the generator channel being exhausted to a region of low pressure which maintains the pressure in the generator channel at an appropriate low level;
   the shaped magnetic field established in the generator channel acting upon the plasma stream to induce azimuthal electric currents in the generator channel which are sufficiently large to cause the plasma conductivity to be materially increased by non-equilibrium ionization.

2. A magnetohydrodynamic generator according to claim 1, wherein
   the plasma stream flows in the generator channel as a train of plasma pulses,
   and the generator further comprises
   a diffuser section attached to the generator channel; and
   exhaust means for drawing exhaust gases out of the diffuser section whereby the appropriate low level of pressure is maintained in the generator channel.

3. The magnetohydrodynamic generator according to claim 2, further comprising
   means for inductively coupling to the pulsating magnetic field established by the interaction of the pulsed plasma stream with the shaped magnetic field.

4. The method of magnetohydrodynamically generating electricity, the method comprising the steps of
   1. producing hot gases;
   2. accelerating the hot gases by expansion to produce a high velocity stream of plasma;
   3. causing the high velocity plasma stream to flow axially into a generator channel;
   4. establishing in the generator channel a magnetic field having a large component that is radial with respect to the longitudinal axis of the generator channel; and
   5. maintaining the pressure in the generator channel at a level sufficiently low to enable the radial component of the magnetic field to act upon the high velocity plasma stream to induce azimuthal electric currents in the generator channel of a magnitude causing the plasma conductivity to be materially increased by non-equilibrium ionization.

5. The method according to claim 4 of magnetohydrodynamically generating electricity, further including the steps of
   causing the high velocity plasma stream to flow in the generator channel as a train of plasma pulses; and
   withdrawing energy from the generator channel as alternating current electricity.

* * * * *